July 31, 1928.
A. EHRLER
1,679,297
METHOD AND APPARATUS FOR PLACING POLES
Filed Feb. 20, 1925  3 Sheets-Sheet 1
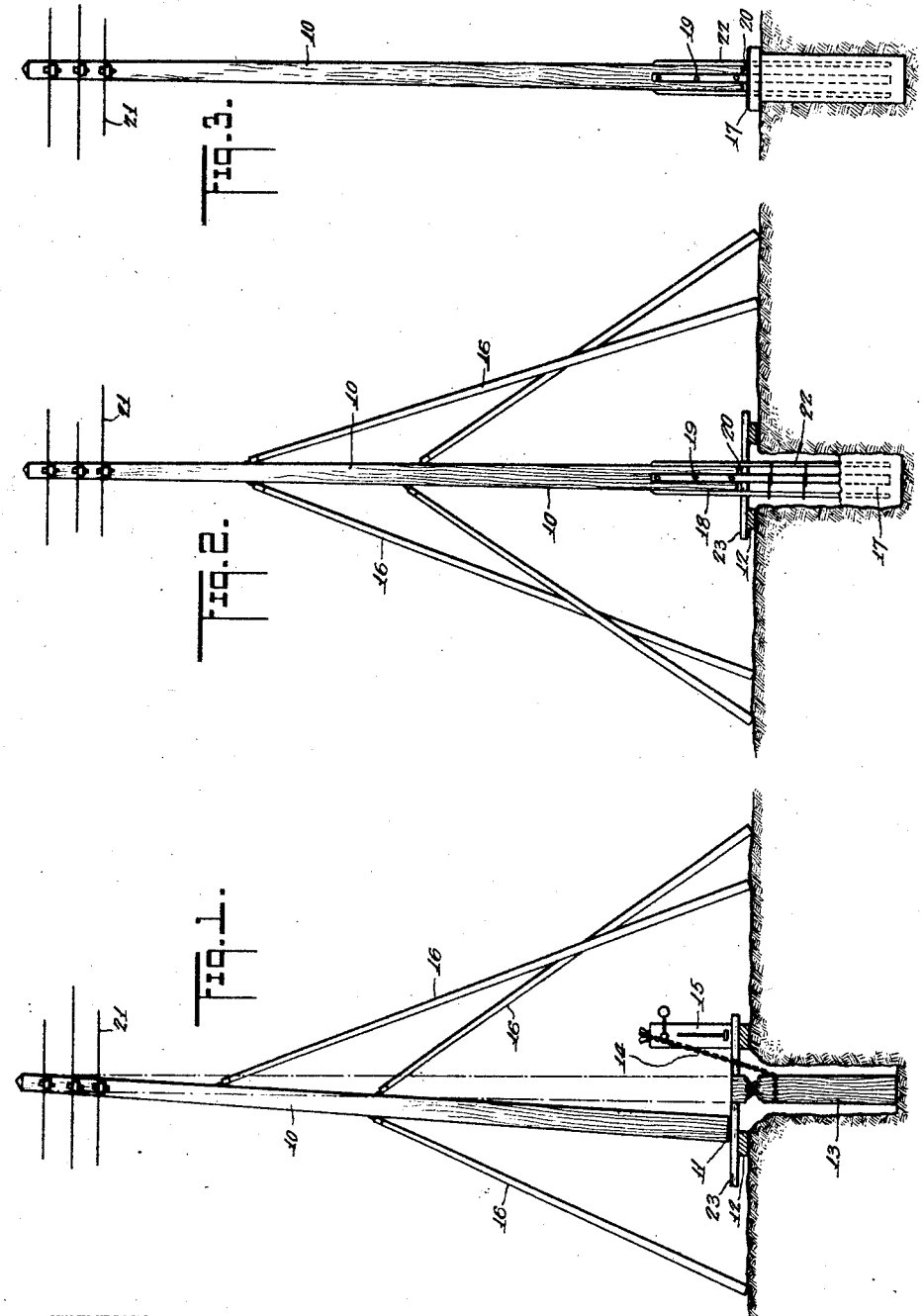
WITNESSES
INVENTOR
*Albert Ehrler*
BY
ATTORNEYS

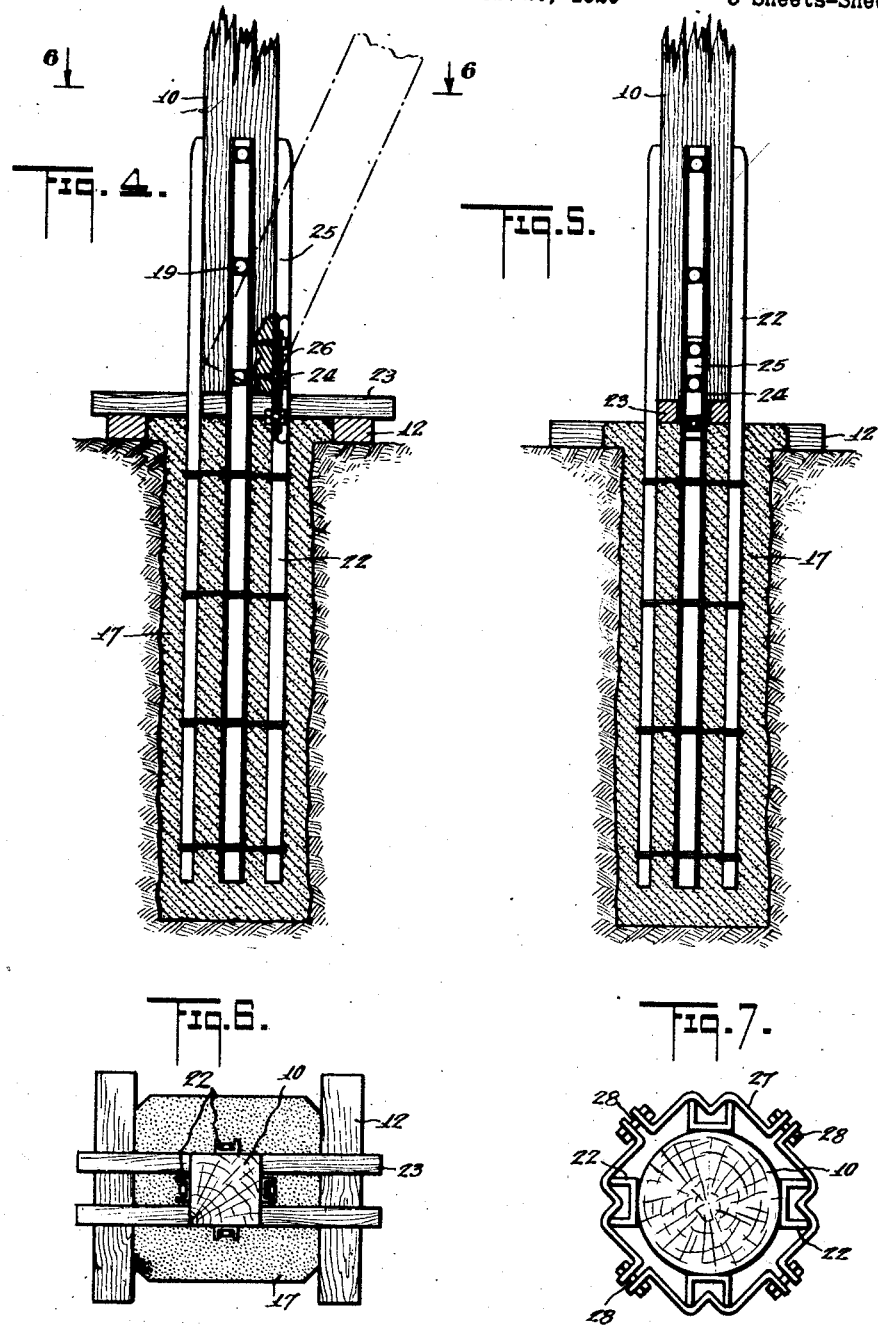

July 31, 1928.
A. EHRLER
1,679,297
METHOD AND APPARATUS FOR PLACING POLES
Filed Feb. 20, 1925
3 Sheets-Sheet 3
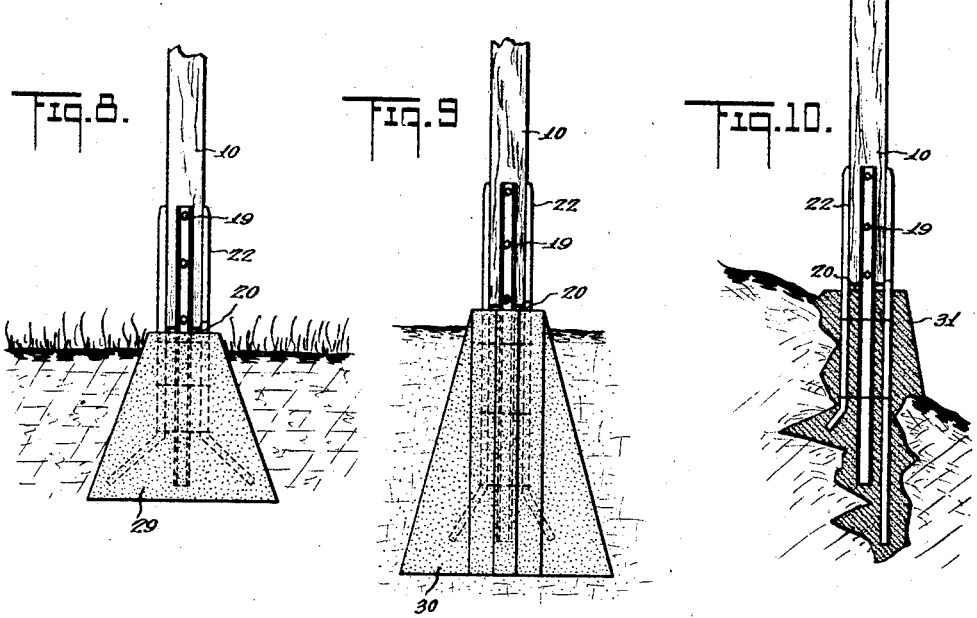
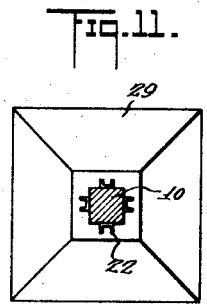
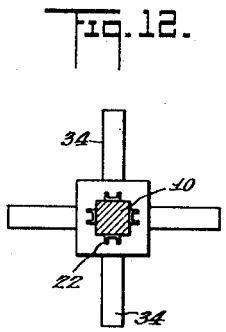
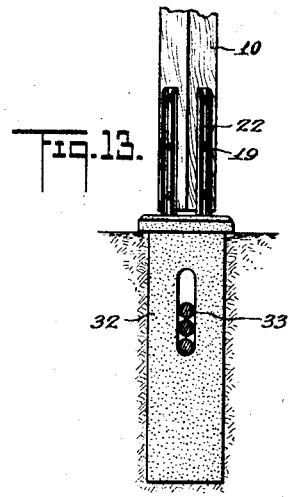
WITNESSES
INVENTOR
ALBERT EHRLER
BY
ATTORNEYS Patented July 31, 1928.

1,679,297

UNITED STATES PATENT OFFICE.

ALBERT EHRLER, OF NEW YORK, N. Y.

METHOD AND APPARATUS FOR PLACING POLES.

Application filed February 20, 1925. Serial No. 10,669.

This invention relates to a method and apparatus for placing poles. An object of the invention is to provide a simple and efficient method and apparatus for placing such poles as telegraph poles and light and power transmission poles.

Another object concerns the provision of a simple and efficient method and apparatus whereby old worn-out poles can be repaired while in place without distributing the lines.

A further object concerns the provision of simple and efficient anchorage for poles whereby they can be securely held in place in all kinds of soil and under all sorts of conditions.

A still further object concerns the provision of a simple and efficient method and apparatus whereby an old pole in use can be either repaired in place with no disturbance whatsoever in the wires or interruption in the service, or an old pole can be removed and a new one substituted.

Another object concerns the provision of simple and efficient means whereby old or new poles can be efficiently supported from an anchor or base in the ground and yet be held off the ground to eliminate the deleterious effects of moisture on the poles when they are embedded in the ground.

The invention is illustrated in the drawings, of which—

Figures 1, 2 and 3 illustrate successive stages in the operation of repairing a worn-out pole without disturbing the wires;

Fig. 4 is a sectional view showing a form of base and socket for the pole;

Fig. 5 is a side section of the pole as shown in Fig. 4;

Fig. 6 is a section on the line 6—6 of Fig. 4;

Fig. 7 is a similar section with a different clamp.

Figs. 8, 9 and 10 are side views of different kinds of anchorages which are used for varying conditions of soil;

Figs. 11 and 12 are respectively horizontal sections of the form of anchorages shown in Figs. 8 and 9; and Fig. 13 is a vertical section through an anchorage which has to be formed around subterranean conduits or cables without removing the cables.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention includes the idea of providing a concrete base embedded in the ground at the location desired for a pole and supporting a socket in said base with a portion of the socket extending above the base or anchorage and adapted to receive the pole, said pole being supported in the socket slightly above the top of the base so that there will be an air space between the bottom of the pole and the top of the anchorage. In this manner the pole is firmly held in position and at the same time is, to a minimum extent, subjected to the deleterious action of moisture.

A further aspect of the invention involves the repair of a worn-out pole which has become weakened through the destructive action of the elements. In this case the pole is sawn off slightly above the level of the ground; the lower end of the upper part of the pole is then moved slightly to one side and held in that position temporarily while the lower sawn-off portion of the pole is removed from the ground. The pole is then placed over the hole; the socket is firmly fixed to the pole, the lower part remaining in the hole; the concrete anchor is then formed in the hole, embedding therein the iron bars, with reenforcing elements. After the concrete has hardened, the platform (studding such as 23, 12) is removed, as well as the bars 16; the concrete top that emerges from the ground is finished smooth and sloped from the center to the sides to prevent the accumulation of water on it. The irons or steel pieces and bolts and the lower part of the pole have a coat of tar or paint to prevent rusting.

A further aspect of the invention involves the modified forms of sockets of different kinds of poles, and also modified forms of anchorages to adapt the method and apparatus for use in different kinds of soil and conditions of soil.

The preferred form of the invention, showing the method, is set forth in Figs. 1, 2 and 3. In these figures, a pole 10 is shown which has become eaten away by the conditions of the soil and the elements and must be repaired. The pole is sawn off along the line 11, slightly above the ground, and the bottom of it is moved laterally on the platform 12. The stump 13 of the pole in the ground is then lifted out of the ground by any suitable means, such as a chain 14 and a jack apparatus 15, shown in Fig. 1. The pole is, in the meantime, held in position by means of the bars 16, which are manually adjustable.

After the stump has been removed, a concrete anchorage 17 is formed in the hole, and in this anchorage socket elements 18 are placed with their upper ends extending above the ground. These socket elements may be of any suitable type, as hereinafter to be described more in detail. Before the anchorage has been formed the pole is moved into engagement within the socket elements and fastened thereto by any suitable means, such as bolts 19. It will be observed that there is an air space 20 between the bottom of the pole and the top of the anchorage. This is for the purpose of preventing the pole from coming directly in contact with moisture from the soil and being subject to other deleterious influences therein. In this way a pole can be readily repaired while the wires 21 are undisturbed. It will easily be perceived that after the pole has been sawn off, the stump removed and an anchorage formed, that a new pole can be put in the socket and that it would not be a difficult matter to shift the wires from the top of the old pole to the top of the new one without materially disturbing them, after which the old pole can be lowered. This would permit a new pole to be substituted for the old one without materially disturbing the wires.

Figs. 4, 5 and 6 illustrate more in detail the character of the anchorage and the socket. The concrete anchorage 17 is shown, and the socket elements are, in the form shown, made of U bars 22 spaced at suitable distances apart to form an opening of the shape of the pole. In the case shown in Figs. 4, 5 and 6, the pole is square, therefore the socket elements are so placed that the space forms a square therebetween. This construction is adapted for either square or round poles. The upper ends of the socket elements extend above the concrete base and are provided with bolts 19, or similar elements, which extend into the pole to hold it in place. In order to permit the pole to be removed from the socket, one of the socket elements is made in sections 24 and 25 and the sections are detachably connected together by a clamping plate fastened to the sections over the joint. When this clamping plate is removed, the upper section 25 can then be removed and by moving the bolts 19 which secure it and the other clamping members to the pole the pole slid out of the socket. This construction also facilitates the placing of the pole in the socket.

In the modification shown in Fig. 7, the socket elements 22 are U bars, but instead of being fastened to the pole by bolts they are embraced by a strap such as 27 provided with adjusting bolts 28 to tighten and clamp the socket elements around the pole without the use of bolts.

In order to adapt the anchorage to different kinds of soil, I provide different shapes of anchorage, as shown in Figs. 8 to 13, inclusive. In Figs. 8 and 11 I show an anchorage 29 of a frusto-conical shape adapted for swampy land. In this case the lower ends of the socket elements are naturally curved or deflected to extend down into the corners of the base or anchorage. In Figs. 9 and 12 I show a similar frusto-conical anchorage 30 being gradually sloped and beveled to adapt it for sandy soil. In Fig. 10 I show an anchorage 31 having a jagged outer surface to permit it to firmly hold the pole on a hilly dirt slope. In Fig. 13 I show an anchorage 32 which has a slot formed therein to permit passage therethrough of conduits or cables 33 which are not disturbed during the formation of the anchorage.

In the form shown in Figs. 9 and 12 the anchorage bars are preferably in the form of wings 34, preferably at right angles to each other.

What I claim is:—

1. The combination with a pole, of a concrete base for the pole, a plurality of channel bars having their lower ends embedded in the base, and their upper ends projecting from the base and secured to the pole, one of the upper end portions of said bars being in two sections, and means for securing the sections together above the ground, said means consisting of a plate in the channel of the sections and screws or bolts passing through the plate and sections into the pole.

2. The method of repairing poles, which comprises severing the pole above the surface of the ground, removing the stump of the pole from the ground, disposing a plurality of members in the hole left by the removal of the stump of the pole with portions thereof projecting above the ground, placing the severed end of the pole between the projecting portions of said members, fastening the projecting portions of said members to the pole, and then pouring concrete in said hole around the members to form a supporting base with the lower portions of said members embedded therein.

3. The method of repairing poles, which comprises severing the pole above the surface of the ground and at a point where the sound wood begins, removing the stump of the pole from the ground, disposing a plurality of members in the hole left by the removal of the stump of the pole with portions thereof projecting above the ground, placing the severed end of the pole between the projecting portions of said members, fastening the projecting portions of said members to the pole, then pouring concrete into said hole around said members to form a supporting base with the lower ends of the members embedded therein, and spacing the lower end of the pole above said base to provide an air space between the severed pole end and said base.

ALBERT EHRLER.